United States Patent
Habib et al.

(10) Patent No.: US 11,998,017 B2
(45) Date of Patent: Jun. 4, 2024

(54) BIO-PESTICIDE FOR JAPANESE BEETLES

(71) Applicants: Matias Habib, Sandwich, IL (US); Kathleen Janick, Sandwich, IL (US)

(72) Inventors: Matias Habib, Sandwich, IL (US); Kathleen Janick, Sandwich, IL (US)

( * ) Notice: Subject to any disclaimer, the term of this patent is extended or adjusted under 35 U.S.C. 154(b) by 38 days.

(21) Appl. No.: 17/733,369

(22) Filed: Apr. 29, 2022

(65) Prior Publication Data

US 2023/0345948 A1     Nov. 2, 2023

(51) Int. Cl.
    *A01N 65/22*     (2009.01)
    *A01N 25/04*     (2006.01)
    *A01N 25/30*     (2006.01)
    *A01N 65/28*     (2009.01)
    *A01P 7/04*     (2006.01)

(52) U.S. Cl.
    CPC .............. *A01N 65/22* (2013.01); *A01N 25/04* (2013.01); *A01N 25/30* (2013.01); *A01N 65/28* (2013.01); *A01P 7/04* (2021.08)

(58) Field of Classification Search
None
See application file for complete search history.

(56) References Cited

PUBLICATIONS

Ballou (Effects of geranium on the Japanese beetle, JOUR ECON ENT, 1929 vol. 22, No. 2, pp. 289-293) (Year: 1929).*
1929.*
Ranger, Christopher M et al. "Rare excitatory amino acid from flowers of zonal geranium responsible for paralyzing the Japanese beetle." Proceedings of the National Academy of Sciences of the United States of America vol. 108,4 (2011): 1217-21. doi:10.1073/pnas.1013497108.
Youssef, Nadeer N et al. "Field evaluation of essential oils for reducing attraction by the Japanese beetle (Coleoptera: Scarabaeidae)." Journal of economic entomology vol. 102,4 (2009): 1551-8. doi: 10.1603/029.102.0420.

* cited by examiner

*Primary Examiner* — Alton N Pryor
(74) *Attorney, Agent, or Firm* — Westman, Champlin & Koehler, P.A.; Amanda M. Prose

(57) ABSTRACT

A pesticide compositionally comprising one or more carrier oils; one or more repellent oils; and an effective amount of quisqualic acid, wherein the pesticide composition is an emulsion for spray application to foliage and wherein physical contact with the pesticide is sufficient to kill a Japanese beetle.

11 Claims, No Drawings

BIO-PESTICIDE FOR JAPANESE BEETLES

BACKGROUND

The present invention relates to a natural pesticide formula for repelling, controlling, and killing adult Japanese beetles utilizing select plant and essential oils for triggering a unique neurological reaction from the Japanese beetle, including inducing paralysis and facilitating death.

The Japanese beetle (*Popillia Japonica*) is a generalist herbivore that feeds on more than 430 wild and cultivated host plants. It is an invasive species with few natural predators. Introduced to the U.S. around 1916, the beetle has successfully spread across much of the eastern United States and continues to move westward. (Shanovich, 2019). The adult beetle is a serious and costly menace to small fruits, orchards, cereal and forage crops, and floriculture. It is practically omnivorous, skeletonizing the leaves and flowers of the host plant. Yearly control costs in the US are estimated at $460 million (USDA-NAS, 2016).

Conventional pesticide control of the adult beetle involves the use of broad-spectrum sprays, such as carbaryl, that are not environmentally friendly. Traps that attract Japanese beetles with floral and sex pheromones are capable of attracting thousands of beetles from a radius of up to 5 miles, often making the infestation worse. Physical methods such as collecting beetles by hand are labor intensive and impractical, and leave foliage unprotected.

SUMMARY

An aspect of the present disclosure relates to a pesticide compositionally comprising one or more carrier oils; one or more repellent oils; and an effective amount of quisqualic acid, wherein the pesticide composition is an emulsion for spray application to foliage and wherein physical contact with the pesticide is sufficient to neutralize a Japanese beetle.

The pesticide further comprises an emulsifying agent.

In one or more embodiments, the quisqualic acid is provided by *Pelargonium* oil.

The one or more carrier oils are selected from the group comprising peanut oil, soybean oil, cotton seed oil, canola (rape seed) oil, corn oil, olive oil, grape seed oil, castor oil, sunflower oil and combinations thereof.

The one or more repellent oils are selected from the group comprising wintergreen, peppermint, cedarwood, citronella, sage, thyme, Juniper berry, pine needle, ginger, rosemary, benzoin, clove, and combinations thereof.

The pesticide is approximately a 10% to approximately 20% oil-in-water emulsion.

The effective amount of the plant oils that contain quisqualic acid is in the range of 10 mL/L to 25 mL/L of the pesticide by volume.

The effective amount of the quisqualic acid is in the range of 0.5 mg/L to 2 mg/L of pesticide by volume.

Another aspect of the present disclosure relates to a pesticide emulsion for spraying on foliage comprising quisqualic acid in an amount sufficient to induce a neurologic effect on or impair a Japanese beetle exposed to physical contact therewith and one or more oils to suffocate the impaired Japanese beetle with approximately 4 to 6 hours of contact.

The pesticide emulsion comprises one or more essential oils for acting as a Japanese beetle repellent.

The pesticide emulsion further comprises a detergent, lecithin or a combination thereof for emulsifying the components in water.

Yet another aspect of the present disclosure relates to a method of neutralizing pests by applying an effective amount of quisqualic acid in an oil in water based emulsion to foliage or to a pest infestation, wherein the effective amount of quisqualic acid impairs the pest on contact with the emulsion.

Applying the effective amount of quisqualic acid comprises spraying the emulsion on the foliage or pest infestation.

The emulsion further comprises one or more essential oils to attract the pest to the emulsion.

DETAILED DESCRIPTION

A natural pesticide composition for use as a foliage spray on plants and trees and designed to repel, control, and kill the adult Japanese beetle is described herein. Owing to naturally-occurring insecticidal characteristics of the ingredients of the composition described herein, the composition is also effective on multiple other garden pests, including aphids, mites, and caterpillars. Compositions according to one or more embodiments described herein comprise approximately 10% to approximately 20% oil-in-water emulsion with a combination of select plant oils and essential oils.

The pesticide described herein is targeted to the Japanese beetle and comprises quisqualic acid and/or *Pelargonium* oil as an active ingredient and configured for spraying on foliage and/or directly on the Japanese beetle. The pesticide is effective on contact and does not need to be ingested by the Japanese beetle.

In one or more embodiments, the pesticide comprises the quisqualic acid and/or *Pelargonium* oil and one or more plant, essential or other oils in water to form an emulsion.

In one or more embodiments, the pesticide comprises one or more carrier oils which may be one or more plant oils; one or more essential oils; quisqualic acid and/or *Pelargonium* oil, and water. The carrier oils may comprise a blend of one or more plant oils that may be non-drying or semi-drying plant oils. The carrier oils provide a base oil for the composition and may aid in suffocating an impaired beetle. One or more essential oils may be provided for purposes of repelling the Japanese beetles. The quisqualic acid and/or *Pelargonium* oil may be provided for the purpose of eliciting a neurological response from the Japanese Beetle though contact therewith, including impairing and/or paralyzing the Japanese beetle.

Amounts of the *Pelargonium* oil may be present in the pesticide composition in the range of about 10 mL/L to 50 mL/L, or more specifically in the range of about 15 mL to 25 mL/L. The quisqualic acid may be present in the pesticide composition in the range of about 0.5 mg/L to 2 mg/L. The quisqualic acid may be provided by one or more plant oils comprising quisqualic acid used in the pesticide composition or the acid may be extracted for use in the pesticide composition.

The one or more carrier oils may be present in the pesticide composition in the range of 75 mL/L to 125 mL/L. The one or more essential oils may be present in the pesticide composition in an amount in the range of 10 mL/1 to 30 mL/L.

The pesticide composition may comprise additional ingredients including, but not limited to emulsifiers, examples of which include, but are not limited to lecithin and detergents. Emulsifying agents may be present in the pesticide composition in a range of 5 mL/L to 10 mL/L. The remaining volume of the composition is water.

The pesticide composition may be provided as an emulsion for spray application to the leaves of susceptible plants and/or to the Japanese beetle directly. However, it is contemplated and within the scope of this disclosure that the composition may be adjusted for provision as a tonic, spray suspension, slurry or other consistency for application directly to foliage or other areas where beetles may land or gather. It is also contemplated that the composition may be painted on or otherwise applied to a target plant and/or target surfaces may be soaked in or with the composition.

In one or more embodiments, a blend of non-drying and semi-drying plant oils, with an iodine value less than or close to 100, acts as a carrier oil base for other active ingredients in the pesticide composition. This blend allows the composition to coat the foliage with a light, oily residue that is rain resistant and leads to the suffocation of insects with exoskeletons as well as suffocation of insect eggs laid thereon. The non-drying and/or semi-drying base oil blend may include, but is not limited to peanut oil, soybean oil, cotton seed oil, canola (rape seed) oil, corn oil, olive oil, grape seed oil, castor oil, sunflower oil and combinations thereof.

Active ingredients in the composition may include essential plant oils that repel the Japanese beetle through strong odors that prevent the Japanese beetle from landing on foliage in their search for food. These essential oils have been tested individually for their repellent qualities with extensive field-testing on Japanese beetles, and include, but are not limited to: wintergreen, peppermint, cedarwood, citronella, sage, thyme, juniper berry, pine needle, ginger, clove oil, and combinations thereof. The essential oils rosemary and benzoin provide both repellent and preservative qualities to the pesticide composition.

The pesticide composition according to one or more embodiments described herein makes use of a phenomenon that is unique to the Japanese beetle. A primary active ingredient of the pesticide is the amino acid quisqualic acid, which elicits a unique neurological response specifically from the Japanese beetle. Quisqualic acid is naturally occurring in the *Pelargonium* and Quisqualic *indica* species of plants. As part of this disclosure, it was discovered that ingestion of the plants' essential oil is not required, but that the absorption of the plants' essential oil through contact by the Japanese beetle, can provoke a sufficient neurological response from the beetle, followed by 24-hour paralysis of the Japanese beetle. That is, the Japanese beetle need not consume the composition according to one or more embodiments herein. The composition is an effective pesticide through contact only by the Japanese beetle.

When the pesticide composition according to one or more embodiments described herein is applied to a susceptible plant, for example, an effective amount being sprayed on a susceptible plant, the insecticidal, non-drying/semi-drying base oil blend coats the foliage of the plant and spreads the repellent essential oils on the surface of the foliage. This coating and spreading of the pesticide composition deters the Japanese beetle from landing on the plant, making the pesticide also a highly effective pre-treatment to avoid Japanese beetle infestation.

Japanese beetles that do land on the leaves, become saturated with the oil and absorb the paralysis-inducing quisqualic acid. Japanese beetles that do feed on the foliage may then also consume the quisqualic acid. Within approximately 4-6 hours, Japanese beetles that consume or absorb the quisqualic acid fall into a 24-hour paralytic state, during which time the paralyzed Japanese beetle often succumb to death due to exposure to the elements, desiccation, and predation before they regain movement.

The pesticide composition described herein is sufficient to neutralize adult Japanese beetles by close contact with the composition. The Japanese beetle absorbs one or more components of the composition including the quisqualic acid, either through contact with a leaf that is coated with the pesticide formula that contains quisqualic acid and/or extracts of the *Pelargonium*, or when the Japanese beetle is sprayed directly with the pesticide composition. When sprayed directly on the Japanese beetle, the Japanese beetle responds with an initial burst of activity by buzzing and flying, but eventually falls into a paralytic state. Japanese beetles that become coated with the pesticide through contact with a treated leaf fall into a paralytic state but typically do not resurrect, without being bound by theory, likely due to suffocation from the oil residue from the pesticide.

The *Pelargonium* plant is a highly preferred host of the Japanese beetle and its presence in a garden is a renowned attractant for Japanese beetles. It is counter-intuitive to include the *Pelargonium* extract as an ingredient in a repellent pesticide. Yet, the unique combination of active ingredient essential oils in the pesticide composition described herein serves to repel the Japanese beetle and prevent the Japanese beetle from landing on foliage, while the quisqualic acid affects and aids in killing those Japanese beetles that do land on or try to feed on the leaves.

The pesticide composition may be provided in the form of an emulsion for spay applications to foliage or to the Japanese beetle directly. To make the pesticide, the oil phase of one or more carrier oils, essential oils, and all active ingredients are blended thoroughly. The oil phase is then added to water with one or more emulsifiers at a ratio of approximately 1-part oil to 8.5 parts water, and the mixture is blended with a high-speed mixer.

The resulting composition is a light-weight, milky emulsion that can be sprayed lightly on the foliage of susceptible plants, providing a protective barrier that repels and kills Japanese beetles and other pests without harming the plant itself. When sprayed directly on an infestation of Japanese beetles, the beetles respond by buzzing and flying off the foliage in a frenzied state, and by dropping directly to the ground and the oil reside remains on the beetle. The oily residue from a single application may remain on the foliage for days, and up to weeks, after initial application depending on humidity levels and temperatures in the location of the foliage.

Example Pesticide Composition 1

An effective Japanese beetle pesticide composition according to the present disclosure comprises a combination of peanut oil, canola oil, castor oil, lecithin, benzoin oil, rosemary oil, wintergreen oil, *Pelargonium* oil, detergent and water in the amounts identified below in TABLE 1.

TABLE 1

| Ingredients | Quantity in ML |
|---|---|
| Peanut Oil | 37.5 |
| Canola Oil | 62.5 |
| Castor Oil | 1.3 |
| Lecithin | 7.2 |
| Benzoin Oil | 0.6 |
| Rosemary oil | 3.4 |
| Wintergreen oil | 12.5 |
| Pelargonium oil | 18.8 |

TABLE 1-continued

| Ingredients | Quantity in ML |
|---|---|
| Detergent | 6.3 |
| H2O | 850.0 |
| TTL Volume | 1000.0 |

The composition above is provided as a milky emulsion for spray application as a pesticide, effective to exterminate Japanese Beetles via physical contact with the Japanese beetle.

Example Pesticide Composition 2

An effective Japanese beetle pesticide composition according to the present disclosure comprises a combination of peanut oil, soybean oil, lecithin, benzoin oil, rosemary oil, wintergreen oil, *Quisqualis indica*, clove oil, detergent and water in the amounts identified below in TABLE 2.

TABLE 2

| Ingredients | Quantity in ML |
|---|---|
| Peanut Oil | 37.5 |
| Soybean Oil | 62.5 |
| Lecithin | 7.5 |
| Benzoin Oil | 0.3 |
| Rosemary oil | 3.4 |
| Wintergreen oil | 11.3 |
| Quisqualis Indica | 18.1 |
| Clove oil | 3.1 |
| Detergent | 6.3 |
| H2O | 850.0 |
| TTL Volume | 1000.0 |

The composition above is provided as a milky emulsion for spray application as a pesticide, effective to exterminate Japanese Beetles via physical contact with the Japanese beetle.

The pesticide composition described herein does not include harsh chemicals, insecticides, and/or non-selective chemical controls. The pesticide composition described herein does not elicit a neurological response in non-pest insects such as pollinators for example.

Although the present disclosure has been described with reference to preferred embodiments, workers skilled in the art will recognize that changes may be made in form and detail without departing from the spirit and scope of the disclosure.

The invention claimed is:

1. A pesticide composition comprising:
   one or more carrier oils;
   one or more repellent oils;
   an emulsifying agent; and
   an effective amount of quisqualic acid, wherein the pesticide composition is an emulsion for spray application to foliage and wherein physical contact of a Japanese beetle with the pesticide is sufficient to neutralize the Japanese beetle.

2. The pesticide composition of claim 1 wherein the quisqualic acid is provided by *Pelargonium* oil.

3. The pesticide composition of claim 1 wherein the one or more carrier oils are selected from the group comprising peanut oil, soybean oil, cotton seed oil, canola (rape seed) oil, corn oil, olive oil, grape seed oil, castor oil, sunflower oil and combinations thereof.

4. The pesticide composition of claim 1 wherein the one or more repellent oils are selected from the group comprising wintergreen, peppermint, cedarwood, citronella, sage, thyme, Juniper berry, pine needle, ginger, rosemary, benzoin, clove, and combinations thereof.

5. The pesticide composition of claim 1 wherein the composition is approximately a 10% to approximately 20% oil-in-water emulsion.

6. The pesticide composition of claim 1 wherein the effective amount of quisqualic acid is in the range of 0.5 mg/L to 2 mg/L of pesticide.

7. A pesticide emulsion for spraying on foliage comprising quisqualic acid in an amount sufficient to induce a neurologic effect on or impair a Japanese beetle exposed to physical contact therewith and one or more oils to suffocate the impaired Japanese beetle with approximately 4 to 6 hours of contact, the pesticide emulsion further comprising a detergent, lecithin, or a combination thereof for emulsifying the components in water.

8. The pesticide emulsion of claim 7 and further comprising one or more essential oils for acting as a Japanese beetle repellent.

9. A method of neutralizing pests comprising:
   applying an effective amount of quisqualic acid in an oil and water base emulsion to foliage or to a pest infestation, wherein the effective amount of quisqualic acid impairs the pest on contact with the emulsion, wherein the pests comprise Japanese beetles.

10. The method of claim 9 wherein applying the effective amount of quisqualic acid comprising spraying the emulsion on the foliage or pest infestation.

11. The method of claim 9 wherein the emulsion further comprises one or more essential oils to attract the pests to the emulsion.

* * * * *